(12) United States Patent
Zhang et al.

(10) Patent No.: US 12,479,944 B2
(45) Date of Patent: Nov. 25, 2025

(54) CELLULOSE NANOCRYSTAL POWDER AND PREPARATION METHOD AND USE THEREOF

(71) Applicant: QINGDAO UNIVERSITY OF SCIENCE AND TECHNOLOGY, Qingdao (CN)

(72) Inventors: Jianming Zhang, Qingdao (CN); Yunxiao Liu, Qingdao (CN); Yongxin Duan, Qingdao (CN); Lijuan Zhou, Qingdao (CN); Yunjie Lu, Qingdao (CN); Xinran Liu, Qingdao (CN)

(73) Assignee: QINGDAO UNIVERSITY OF SCIENCE AND TECHNOLOGY, Qingdao (CN)

( * ) Notice: Subject to any disclaimer, the term of this patent is extended or adjusted under 35 U.S.C. 154(b) by 553 days.

(21) Appl. No.: 18/047,314

(22) Filed: Oct. 18, 2022

(65) Prior Publication Data
US 2023/0076982 A1     Mar. 9, 2023

Related U.S. Application Data

(63) Continuation of application No. PCT/CN2021/129803, filed on Nov. 10, 2021.

(30) Foreign Application Priority Data

Jul. 19, 2021   (CN) ................. 202110810941.1

(51) Int. Cl.
  C08F 251/02       (2006.01)
  C08L 51/02        (2006.01)
  G03F 7/38         (2006.01)

(52) U.S. Cl.
  CPC ............ C08F 251/02 (2013.01); C08L 51/02 (2013.01); G03F 7/38 (2013.01)

(58) Field of Classification Search
  CPC .................................................. C08F 251/02
  See application file for complete search history.

(56) References Cited

U.S. PATENT DOCUMENTS

| | | | | |
|---|---|---|---|---|
| 5,714,540 | A * | 2/1998 | Tanaka | C08B 31/16 525/54.31 |
| 2004/0068073 | A1* | 4/2004 | Doane | C08B 31/00 525/54.31 |
| 2015/0322191 | A1* | 11/2015 | Hamad | C08B 15/06 525/107 |
| 2017/0027168 | A1* | 2/2017 | Heath | A61P 17/00 |
| 2019/0245155 | A1* | 8/2019 | Heath | H10K 85/221 |
| 2020/0270442 | A1* | 8/2020 | Ok | C08F 251/02 |
| 2020/0317821 | A1* | 10/2020 | Williams | C08B 11/14 |
| 2021/0087364 | A1* | 3/2021 | Akashi | C08L 1/04 |
| 2023/0155172 | A1* | 5/2023 | Chen | H01M 10/0565 429/303 |

FOREIGN PATENT DOCUMENTS

| | | | | |
|---|---|---|---|---|
| CN | 104086709 | A | | 10/2014 |
| CN | 105111378 | A | | 12/2015 |
| CN | 104045771 | B | * | 2/2017 |
| CN | 110885405 | A | * | 3/2020 ............ C08F 251/02 |
| CN | 113402670 | A | | 9/2021 |

OTHER PUBLICATIONS

Hsu et al. (Journal of Polymer Science: Part A Polymer Chemistry, vol. 31,3213-3222 (1993)) (Year: 1993).*
Machine Translation of CN 110885405, 2025 (Year: 2025).*
Machine Translation of CN 104045771, 2025 (Year: 2025).*

* cited by examiner

*Primary Examiner* — Liam J Heincer
(74) *Attorney, Agent, or Firm* — HAUPTMAN HAM, LLP

(57) ABSTRACT

A preparation method includes 1) dispersing cellulose nanocrystal in water and adjusting pH to 7; 2) adding carboxylate to the aqueous dispersion of the step 1), and stirring until uniform; and 3) adding a monomer and a ceric ammonium nitrate initiator to the system of the step 2), reacting for 0.5-3 h to obtain a precipitate, and subjecting the precipitate to suction filtration, washing, and drying to obtain the cellulose nanocrystal powder. By adding a small amount of carboxylate into a cellulose nanocrystal graft polymer modification system initiated by ceric ammonium nitrate, hydrolysis of cerium ions can be inhibited through complexation of the carboxylate to the cerium ions which play an initiating role in ceric ammonium nitrate, so that ceric ammonium nitrate can initiate the polymerization reaction under acid-free conditions, thereby achieving polymerization of polyvinyl acetate monomer on the surface of cellulose nanocrystals.

8 Claims, 1 Drawing Sheet

CELLULOSE NANOCRYSTAL POWDER AND PREPARATION METHOD AND USE THEREOF

CROSS-REFERENCE TO RELATED APPLICATION(S)

This application is a Continuation of International Application No. PCT/CN2021/129803, filed Nov. 10, 2021, which claims the priority of Chinese patent application No. CN202110810941.1, titled "CELLULOSE NANOCRYSTAL POWDER AND PREPARATION METHOD AND USE THEREOF", filed with CNIPA on Jul. 19, 2021, which are both incorporated herein by reference in their entireties.

TECHNICAL FIELD

The present application relates to the technical field of nanocomposite preparation, and in particular to a cellulose nanocrystal powder and a preparation method thereof.

BACKGROUND

The information disclosed in the Background is merely intended to enhance an understanding of the general background of the present application and should not be taken as an acknowledgement or any form of suggestion that the information constitutes prior art that is known to those skilled in the art.

Cellulose nanocrystals are one-dimensional rod-shaped nanomaterials derived from natural cellulose. They exhibit characteristics including large specific surface area (250-500 $m^2/g$), low density (1.5-1.6 $g/cm^3$) and excellent mechanical properties (tensile strength: 7500 MPa, elastic modulus: 100-140 GPa), etc. They have potential applications in the preparation of lightweight high-strength polymer-based nanocomposites. However, when dried cellulose nanocrystal powders are melt-blended with polymers, the cellulose nanocrystals could not be uniformly dispersed due to strong hydrogen bonding effect resulted from abundant hydroxyl groups on the surface of the cellulose nanocrystals. Therefore, the cellulose nanocrystal needs to be surface-modified. Polymer grafting modification on the surface of cellulose nanocrystal in aqueous medium, with ceric ammonium nitrate as an initiator, is an efficient method.

Ceric ammonium nitrate can be complexed with the hydroxyl groups of $C_2$ and $C_3$ in cellulose, and single electron transfer occurs to generate free radicals on the surface of cellulose nanocrystals, so that both chain initiation and chain growth are generated on the surface of cellulose nanocrystal, therefore, the method has high grafting yield and grafting efficiency. However, the ceric ammonium nitrate initiation system has the following problems: 1) ceric ammonium nitrate is easily hydrolyzed in water, and in order to inhibit its hydrolysis, it is necessary to add a large amount of strong acid into the system, which will undoubtedly cause certain acid pollution to the environment; and 2) only petroleum-based polymers can be grafted by current ceric ammonium nitrate initiation system, which destroys the advantages of cellulose nanocrystals as bio-based materials. Polyvinyl acetate is a polymer derived from renewable biological resources whose monomer vinyl acetate can be synthesized from bioethanol. However, polyvinyl acetate is difficult to be grafted on the surface of cellulose nanocrystals. On the one hand, the monomer vinyl acetate is easily hydrolyzed in a strong acid environment and loses the ability to polymerize. On the other hand, vinyl acetate free radicals produced during polymerization are very reactive and are highly susceptible to chain transfer and termination reactions. Acetaldehyde produced by hydrolysis of vinyl acetate under acidic conditions can be used as a chain transfer agent to further promote chain transfer, which will undoubtedly greatly reduce the grafting yield and grafting efficiency of polyvinyl acetate on the surface of cellulose nanocrystal, resulting in irreversible agglomeration of cellulose nanocrystal in the powder.

SUMMARY

Objects of the Present Application

In order to solve the problem in the prior art that it is necessary to perform grafting modification of cellulose nanocrystal with monomers initiated by ceric ammonium nitrate in a strong acid environment, and some monomers are easily hydrolyzed in the strong acid environment and lose the ability to polymerize, the present application provides a cellulose nanocrystal powder and a preparation method and use thereof, wherein a very small amount of carboxylate is added in a ceric ammonium nitrate initiation system, and hydrolysis of cerium ions in water can be inhibited through complexation of the carboxylate and cerium ions, thereby stabilizing the cerium ions and ensuring the initiation activity.

Solution

In order to achieve the object of the present application, the embodiments of the present application provide a preparation method of a cellulose nanocrystal powder, comprising the following steps:
1) dispersing cellulose nanocrystal in water and adjusting pH to 7;
2) adding carboxylate to the aqueous dispersion of the step 1), and stirring until uniform; and
3) adding a monomer and a ceric ammonium nitrate initiator to the system of the step 2), reacting for 0.5-3 h to obtain a precipitate, and subjecting the precipitate to suction filtration, washing, and drying to obtain the cellulose nanocrystal powder.

The preparation method of the present application is universal, and can be applicable to a variety of vinyl monomers, especially to polymer monomers which are easily hydrolyzed in a strong acid environment.

Further, the cellulose nanocrystal in the step 1) is one or more selected from hydroxylated cellulose nanocrystal, sulfonated cellulose nanocrystal, hydroformylated cellulose nanocrystal, and carboxylated cellulose nanocrystal.

Further, in the step 2), after adding the carboxylate, concentration of the carboxylate in the reaction system is 0.01-0.6 mmol/L, optionally 0.15-0.4 mmol/L, and optionally 0.16-0.19 mmol/L.

Further, the carboxylate added in the step 2) is one or more selected from sodium malate, sodium oxalate, sodium acetate, sodium citrate, sodium humate, sodium succinate, disodium edetate, tetrasodium edetate, sodium glutamate, sodium glycinate, sodium alanine, sodium valine, sodium leucine, sodium lactate, sodium tartrate, sodium carboxymethyl cellulose, and sodium alginate.

Further, the monomer in the step 3) is vinyl acetate monomer.

Further, mass ratio of the vinyl acetate to the cellulose nanocrystal is 1:1 to 10:1, optionally 4:1 to 8:1, and optionally 4:1 to 6:1.

Further, mass ratio of the ceric ammonium nitrate initiator to the cellulose nanocrystal is 1:10 to 1:2, optionally 1:8 to 1:4, and optionally 1:5 to 1:4.

Further, the reaction of the step 3) is performed at room temperature, and may be performed at 5 to 40° C., optionally at 15 to 30° C., and optionally at 20 to 28° C.

In another aspect, provided is a cellulose nanocrystal powder, which is prepared by the preparation method of cellulose nanocrystal powder as described above.

Further, grafting yield of the polymer on the surface of cellulose nanocrystal is 300% to 600%, and grafting efficiency is 80-99%.

In yet another aspect, provided is use of the cellulose nanocrystal hydrophobic powder in polymer processing, in which the cellulose nanocrystal hydrophobic powder is uniformly dispersed in a polymer matrix.

Beneficial Effects (1) In the present application, by adding a very small amount of carboxylate into a cellulose nanocrystal graft polymer modification system initiated by ceric ammonium nitrate, hydrolysis of cerium ions can be inhibited through complexation of the carboxylate to the cerium ions which play an initiating role in ceric ammonium nitrate, so that ceric ammonium nitrate can initiate the polymerization reaction under acid-free conditions, thereby achieving polymerization of polyvinyl acetate monomers on the surface of cellulose nanocrystals. The preparation method in the present application is not limited by surface functional groups of cellulose nanocrystal, and has universality for cellulose nanocrystals with different surface functional groups.

(2) When the monomer is vinyl acetate from bio-based sources, the acid-free reaction conditions inhibit hydrolysis of vinyl acetate monomer and chain transfer reaction during polymerization, so that polyvinyl acetate can achieve high monomer conversion, grafting yield and grafting efficiency on the surface of cellulose nanocrystal in an aqueous phase initiation system of ceric ammonium nitrate. The powder obtained after drying the cellulose nanocrystal grafted with polyvinyl acetate can be thermally processed with polymers and uniformly dispersed.

(3) The cellulose nanocrystal of the present application spontaneously precipitates from water during modification, have the effect of self-purification, and there is no need to dialyze a cellulose nanocrystal suspension to remove impurities prior to modification. The modification process is carried out in an aqueous system and is environmentally friendly.

(4) At present, ceric ammonium nitrate can only initiate grafting of petroleum-based polymers, which destroys the advantages of cellulose nanocrystals as bio-based nanomaterials. The present application proposes a method for initiating grafting of cellulose nanocrystal with a bio-based monomer in an aqueous acid-free phase. In this method, a very small amount of carboxylate is added in a ceric ammonium nitrate initiation system, and hydrolysis of cerium ions in water can be inhibited through complexation of the carboxylate and cerium ions, thereby stabilizing the cerium ions and ensuring the initiation activity.

BRIEF DESCRIPTION OF THE DRAWINGS

One or more embodiments are illustrated by way of exemplary and not by way of limitation in the figures of the accompanying drawings. The word "exemplary" is used exclusively herein to mean "serving as an example, Example, or illustration". Any embodiment described herein as "exemplary" is not necessarily to be construed as preferred or advantageous over other embodiments.

DETAILED DESCRIPTION OF THE INVENTION

In order to make the objects, technical solutions and advantages of the embodiments of the present application clearer, the technical solutions in the embodiments of the present application will be clearly and completely described below. Obviously, the described embodiments are some embodiments of the present application rather than all embodiments. Based on the embodiments in the present application, all the other embodiments obtained by a person skilled in the art without involving any inventive effort fall within the protection scope of the present application. Unless expressly stated otherwise, throughout the specification and claims, the term "comprise", or variations such as "comprises" or "comprising" and the like, will be understood to imply the inclusion of stated elements or components but not the exclusion of any other elements or other components.

In addition, in the following detailed description, numerous specific details are set forth in order to provide a thorough understanding of the present application. It will be understood by those skilled in the art that the present application may be practiced without some of these specific details. In some examples, materials, components, methods, means, etc. well known to those skilled in the art are not described in detail in order to highlight the subject matter of the present application.

The monomer conversion rate, grafting yield and grafting efficiency in the present application are calculated as follows:

$$\text{Monomer conversion rate} = \frac{\text{Mass of monomer added}}{\text{Total mass of polymer produced}} \times 100\%$$

$$\text{Grafting yield} = \frac{\text{Mass of polymer grafted on the surface of cellulose nanocrystal}}{\text{Mass of cellulose nanocrystal}} \times 100\%$$

$$\text{Grafting efficiency} = \frac{\text{Mass of polymer grafted on the surface of cellulose nanocrystal}}{\text{Total mass of polymer produced}} \times 100\%$$

Example 1

Figure 1:
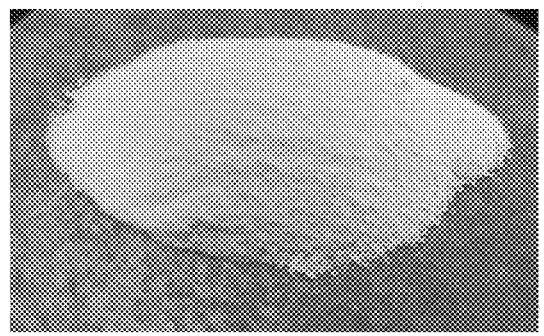
FIG. 1 is a photograph of the polyvinyl acetate graft-modified cellulose nanocrystal powder prepared in Example 1 of the present application.

To a three-neck flask, 20 mL 1% sulfonated cellulose nanocrystal aqueous suspension and 7 mg sodium malate were added, and pH was adjusted to 7. After sonication, 0.05 g ceric ammonium nitrate and 1 g vinyl acetate were added to the system. After sufficient stirring and reacting at 25° C.

for 2 h, the mixture was taken out for washing and dried in a blast drying oven to obtain a white cellulose nanocrystal powder. The conversion rate of vinyl acetate was 80%, the grafting yield of polyvinyl acetate on the surface of cellulose nanocrystal was 350%, and the grafting efficiency was 87%. The obtained cellulose nanocrystal powder is shown in FIG. 1.

Example 2

The amount of raw materials used and the process flow are the same as those in Example 1, except that hydroxylated cellulose nanocrystal were selected as the matrix, and a white cellulose nanocrystal powder was obtained. The conversion rate of vinyl acetate was 75%, the grafting yield of polyvinyl acetate on the surface of cellulose nanocrystal was 300%, and the grafting efficiency was 80%.

Example 3

The amount of raw materials used and the process flow are the same as those in Example 1, except that hydroformylated cellulose nanocrystal were selected as the matrix, and a white cellulose nanocrystal powder was obtained. The conversion rate of vinyl acetate was 82%, the grafting yield of polyvinyl acetate on the surface of cellulose nanocrystal was 360%, and the grafting efficiency was 88%.

Example 4

The amount of raw materials used and the process flow are the same as those in Example 1, except that sodium malate was replaced with sodium citrate, and a white cellulose nanocrystal powder was obtained. The conversion rate of vinyl acetate was 86%, the grafting yield of polyvinyl acetate on the surface of cellulose nanocrystal was 380%, and the grafting efficiency was 88%.

Example 5

The amount of raw materials used and the process flow are the same as those in Example 1, except that sodium malate was replaced with sodium oxalate, and a white cellulose nanocrystal powder was obtained. The conversion rate of vinyl acetate was 76%, the grafting yield of polyvinyl acetate on the surface of cellulose nanocrystal was 270%, and the grafting efficiency was 71%.

Example 6

The amount of raw materials used and the process flow are the same as those in Example 1, except that carboxylated cellulose nanocrystal were selected as the matrix, wherein carboxyl content of the carboxylated cellulose nanocrystal matrix was 0.2 mmol/g, and a white cellulose nanocrystal powder was obtained. The conversion rate of vinyl acetate was 82%, the grafting yield of polyvinyl acetate on the surface of cellulose nanocrystal was 340%, and the grafting efficiency was 83%.

Comparative Example 1

The type and amount of raw materials used and process flow are the same as those in Example 1, except that sodium malate was not contained in the system, and the product was dried to obtain a hard lump. The conversion rate of vinyl acetate was 20%, the grafting yield of polyvinyl acetate on the surface of cellulose nanocrystal was 5%, and the grafting efficiency was 5%.

The low grafting yield in this comparative example further illustrates that when no carboxylate is added to the reaction system, and pH is 7, the grafting yield is low due to the hydrolysis of ceric ammonium nitrate.

Figure 2:
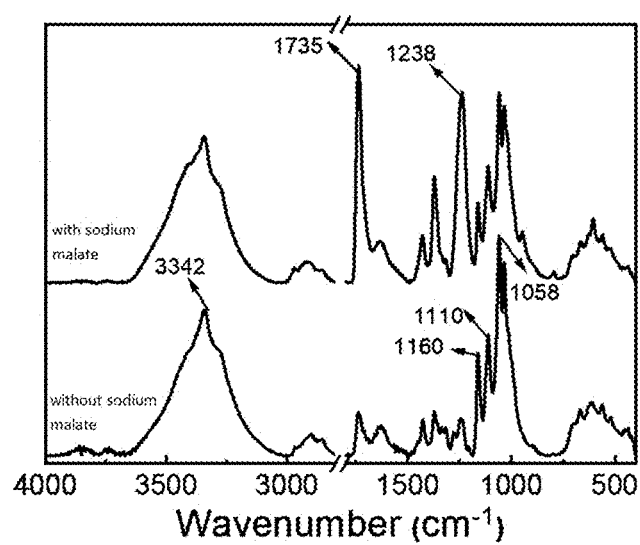
FIG. 2 is an infrared spectrum of the polyvinyl acetate graft-modified cellulose nanocrystal prepared in Example 1 and Comparative Example 1 of the present application. The peaks at 1735 and 1238 $cm^{-1}$ are absorption peaks of the ester group and C—O—C of polyvinyl acetate, respectively.

The polyvinyl acetate graft-modified cellulose nanocrystal prepared in Example 1 and Comparative Example 1 were tested, and the infrared spectrum is shown in FIG. 2, indicating that the polyvinyl acetate has a higher grafting yield on the surface of the cellulose nanocrystal after the addition of sodium malate.

Comparative Example 2

The type and amount of raw materials used and process flow are the same as those in Example 1, except that the pH of the system was adjusted to 2, and the product was dried to obtain a hard lump. The conversion rate of vinyl acetate was 10%, the grafting yield of polyvinyl acetate on the surface of cellulose nanocrystal was 5%, and the grafting efficiency was 10%.

The low grafting yield in this comparative example indicates that vinyl acetate is easily decomposed under acidic conditions, and it is difficult to achieve polymerization.

Comparative Example 3

The amount of raw materials used and the process flow are the same as those in Example 1, except that carboxylated cellulose nanocrystal were selected as the matrix without adding sodium malate, and the product was dried to obtain a hard lump. The conversion rate of vinyl acetate was 65%, the grafting yield of polyvinyl acetate on the surface of cellulose nanocrystal was 26%, and the grafting efficiency was 8%.

The low grafting yield and grafting efficiency in this comparative example indicates that cerium ions stabilized by small molecule carboxylate have higher initiation ability, and cerium ions stabilized by carboxylated cellulose nanocrystal results in low grafting yield and grafting efficiency due to large steric hindrance and weak mobility.

Comparative Example 4

The amount of raw materials used and the process flow are the same as those in Example 1, except that carboxylated cellulose nanocrystal were selected as the matrix and no sodium malate was added, wherein carboxyl content of the carboxylated cellulose nanocrystal was 1.2 mmol/g, and the product was dried to obtain a hard lump. The conversion rate of vinyl acetate was 20%, the grafting yield of polyvinyl acetate on the surface of cellulose nanocrystal was 3%, and the grafting efficiency was 3%.

This comparative example shows that when carboxyl group content on the surface of carboxylated cellulose nanocrystal is high, the addition of ceric ammonium nitrate can cause the cellulose nanocrystal to undergo ionic cross-linking and precipitate from water, affecting uniformity of grafting and initiation ability of ceric ammonium nitrate.

The present application can achieve polymer graft modification with ceric ammonium nitrate on the surface of cellulose nanocrystal with different surface functional groups under acid-free conditions. The acid-free conditions enable the graft polymerization of bio-based monomer—vinyl acetate—on the surface of cellulose nanocrystals with high monomer conversion, grafting yield and grafting efficiency. The powder obtained after drying the cellulose nanocrystal grafted with polyvinyl acetate can be thermally processed with polymers and uniformly dispersed.

Finally, it should be noted that: the above examples are merely used to illustrate the technical solutions of the present application, rather than to limit them; although the present application has been described in detail with reference to the foregoing examples, those skilled in the art will appreciate that: the technical solutions disclosed in the above examples can still be modified, or some of the technical features thereof can be replaced by equivalents; and these modifications or substitutions do not depart from the spirit and scope of the technical solutions of the examples of the present application in nature.

INDUSTRIAL APPLICABILITY

The present application provide a cellulose nanocrystal powder and a preparation method thereof, by 1) dispersing cellulose nanocrystal in water and adjusting pH to 7; 2) adding carboxylate to the aqueous dispersion of the step 1), and stirring until uniform; and 3) adding a monomer and a ceric ammonium nitrate initiator to the system of the step 2), reacting for 0.5-3 h to obtain a precipitate, and subjecting the precipitate to suction filtration, washing, and drying to obtain the cellulose nanocrystal powder. The present application can achieve initiation of polymerization reaction by ceric ammonium nitrate under acid-free conditions, thereby achieving polymerization of polyvinyl acetate monomer on the surface of cellulose nanocrystals.

What is claimed is:

1. A preparation method of a cellulose nanocrystal powder, comprising the following steps:
   1) dispersing cellulose nanocrystal in water and adjusting pH to 7;
   2) adding carboxylate to the aqueous dispersion of the step 1), and stirring until uniform, wherein the carboxylate is one or more selected from sodium malate, sodium oxalate, and sodium citrate; and
   3) adding a monomer and a ceric ammonium nitrate initiator to the system of the step 2), reacting for 0.5-3 h to obtain a precipitate, and subjecting the precipitate to suction filtration, washing, and drying to obtain the cellulose nanocrystal powder, wherein the monomer is vinyl acetate monomer.

2. The preparation method of the cellulose nanocrystal powder according to claim 1, wherein the cellulose nanocrystal in the step 1) is one or more selected from hydroxylated cellulose nanocrystal, sulfonated cellulose nanocrystal, hydroformylated cellulose nanocrystal, and carboxylated cellulose nanocrystal.

3. The preparation method of the cellulose nanocrystal powder according to claim 1, wherein in the step 2), after adding the carboxylate, concentration of the carboxylate in the reaction system is 0.01-0.6 mmol/L, optionally 0.15-0.4 mmol/L, and optionally 0.16-0.19 mmol/L.

4. The preparation method of the cellulose nanocrystal powder according to claim 1, wherein mass ratio of the vinyl acetate to the cellulose nanocrystal is 1:1 to 10:1, optionally 4:1 to 8:1, and optionally 4:1 to 6:1;
   and/or mass ratio of the ceric ammonium nitrate initiator to the cellulose nanocrystal is 1:10 to 1:2, optionally 1:8 to 1:4, and optionally 1:5 to 1:4.

5. The preparation method of the cellulose nanocrystal powder according to claim 1, wherein the reaction of the step 3) is performed at 5 to 40° C., optionally at 15 to 30° C., and optionally at 20 to 28° C.

6. A cellulose nanocrystal powder which is prepared by the preparation method of the cellulose nanocrystal powder according to claim 1.

7. The cellulose nanocrystal powder according to claim 6, wherein grafting yield of the polymer on the surface of the cellulose nanocrystal is 300% to 600%, and grafting efficiency is 80-99%.

8. A method of polymer processing, comprising uniformly dispersing the cellulose nanocrystal powder according to claim 6 in a polymer matrix.

* * * * *